United States Patent [19]
Park

[11] Patent Number: 6,014,362
[45] Date of Patent: Jan. 11, 2000

[54] PHASE-SHIFT AND TILT ADJUSTABLE DISK PLAYER

[75] Inventor: Hi-deuk Park, Seongnam, Rep. of Korea

[73] Assignee: Samsung Electronics Co., Ltd., Kyungki-do, Rep. of Korea

[21] Appl. No.: 08/873,595

[22] Filed: Jun. 12, 1997

[30] Foreign Application Priority Data

Jun. 17, 1996 [KR] Rep. of Korea ............. 96-21839

[51] Int. Cl.⁷ ............................................. G11B 23/00
[52] U.S. Cl. ............................... 369/258; 369/264
[58] Field of Search ............................ 369/258, 212, 369/213, 236, 269, 44.32, 244, 263, 264, 292

[56] References Cited

U.S. PATENT DOCUMENTS

| | | | |
|---|---|---|---|
| 4,694,442 | 9/1987 | Gijzen et al. | 369/44 |
| 5,056,078 | 10/1991 | Carey et al. | 369/77.2 |
| 5,132,534 | 7/1992 | Namigawara | 250/239 |
| 5,796,707 | 8/1998 | Kim | 369/219 |

FOREIGN PATENT DOCUMENTS

| | | | |
|---|---|---|---|
| 2222718 | 3/1973 | France | 369/44 |
| 402141959 | 5/1990 | Japan | 369/44 |

*Primary Examiner*—David L. Ometz
*Assistant Examiner*—Tod Kupstus
*Attorney, Agent, or Firm*—Sughrue, Mion, Zinn, Macpeak & Seas, PLLC

[57] ABSTRACT

A phase-shift and tilt adjustable disk player includes a motor plate to which a spindle motor is fixed. An elastic attaching portion is provided for attaching the motor plate to a deck and simultaneously elastically biasing the motor plate toward the deck. Two adjusting screws are screw-threaded to the deck and each adjusting screw has an end portion which contacts a side portion from the bottom surface of the motor plate for lifting and lowering the motor plate from the deck at one side by a rotation thereof. A cam-shaped phase adjusting member is rotatably installed on the deck for moving the motor plate in a tangential direction of a disk. Therefore, a phase-shift and tilt of an optical pickup can be effectively adjusted by controlling the position and tilt of the spindle motor.

12 Claims, 4 Drawing Sheets

PHASE-SHIFT AND TILT ADJUSTABLE DISK PLAYER

BACKGROUND OF THE INVENTION

The present invention relates to a disk player and, more particularly, to a disk player in which a phase-shift and tilt of an optical pickup can be adjusted.

In general, a disk player using as a recording medium disks such as a compact disk (CD), a video-CD, a laser disk (LD), a digital video disk (DVD), a CD-ROM, or a DVD-ROM which can store more information on a disk having a limited recording area has been developed. Accordingly, to store more information on a disk having the same recording area, the width of a recording track of the disk should be narrowed and the distance between tracks should be decreased. Also, a highly accurate optical pickup and a deck mechanism corresponding thereto is required to record information on and reproduce information from the high density disk.

To maintain the highly accurate deck mechanism, there should be no tilting of the optical pickup in which light is irradiated from the optical pickup at an angle to a disk. The types of tilt include a radial tilt in which light is irradiated at an angle in a radial direction of the disk and a tangential tilt in which light is irradiated at an angle in a tangential direction of the disk.

Also, a phase shift is generated when the optical pickup reciprocatively deviates from a path in a radial direction of the disk, although the optical pickup must accurately reciprocate radially across the disk toward the center of the disk.

Referring to FIG. 1, in a conventional disk player, both ends of a guide rail 3 are fixed to a deck 5 by brackets 4 and a spindle motor 6 is fixed to the deck 5 by a screw 7. The spindle motor 6 rotates a disk (not shown) placed on a turntable 2 by rotating the turntable 2. A pair of guide rails 3 guide the optical pickup 1 to move radially with respect to the disk.

In the above structure, when the guide rails 3 are not assembled parallel to the plane of the deck 5 due to allowance for assembly of the bracket 4 and allowance for manufacturing of the bracket 4 itself, or when the spindle motor 6 is not installed perpendicular to the plane of the deck 5, the light emitted from the optical pickup 1 does not accurately hit the disk so that an error occurs in the operation of the optical pickup 1. Also, a reproducing error of the optical pickup 1 occurs due to the phase shift which is generated when the optical pickup 1 reciprocates as being deviated from the disk-radius directional path.

SUMMARY OF THE INVENTION

To solve the above problem, it is an object of the present invention to provide a phase-shift and tilt adjustable disk player by which light emitted from an optical pickup can be irradiated accurately to a disk.

Accordingly, to achieve the above object, there is provided a phase-shift and tilt adjustable disk player including: a deck; a motor plate to which a spindle motor is fixed, the motor plate defining a top surface and a bottom surface; means for elastically attaching the motor plate to the deck and simultaneously elastically biasing the motor plate toward the deck; means for adjustably lifting and lowering the motor plate from the deck at one side by a rotation thereof; and a cam-shaped phase adjusting member, rotatably installed on the deck, for moving the motor plate in a tangential direction of a disk.

It is preferable that the means for adjustably lifting and lowering the motor plate includes: a tangential screw having an end portion which contacts one side portion of the bottom surface of the motor plate in order to adjust the tilt thereof in a tangential direction; and a radial screw, installed to be perpendicular to the tangential screw with respect to the contact point, of which an end portion contacts another side portion of the bottom surface of the motor plate to adjust the tilt thereof in a radial direction.

Also, it is preferable that the phase adjusting member is inserted into a phase hole formed in the motor plate, and the motor plate is moved according to the rotation of the phase adjusting member.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
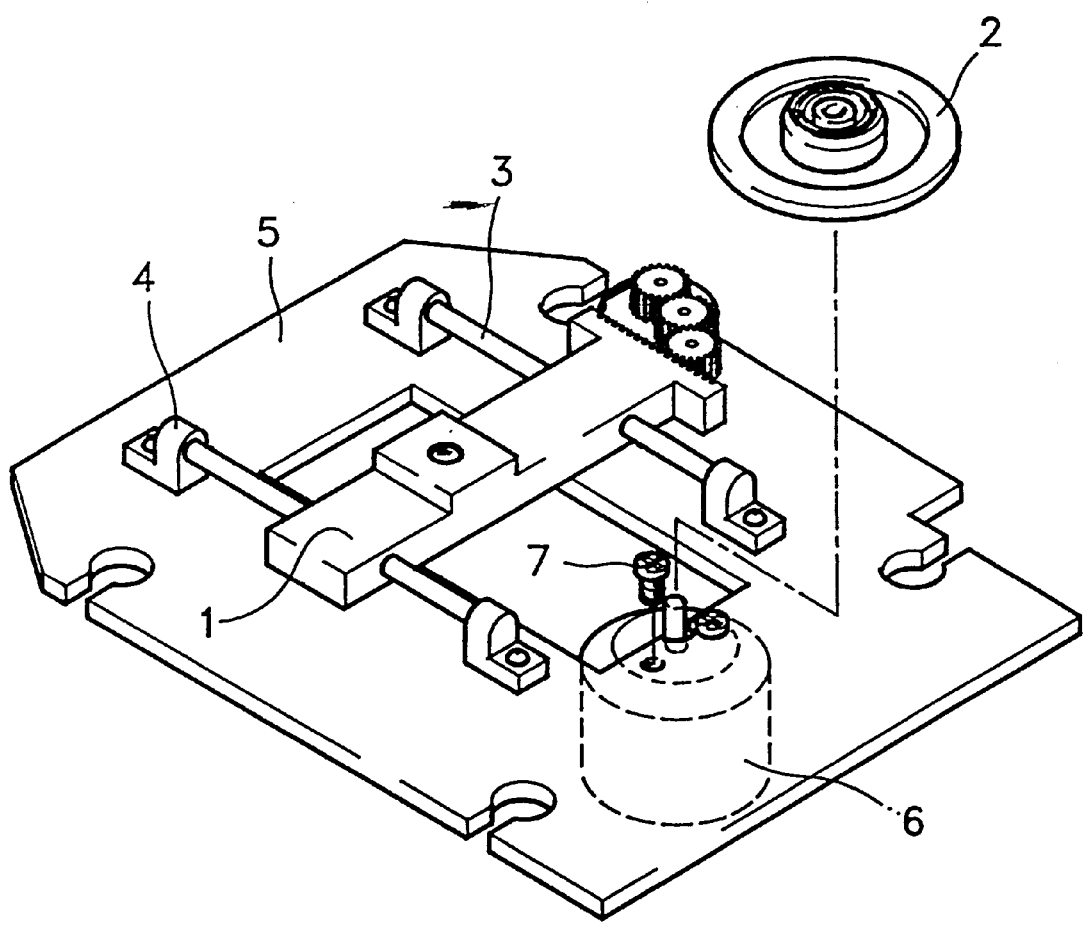
FIG. 1 is a perspective view illustrating an optical pickup and a spindle motor installed on a deck of a conventional disk player.
Figure 2:
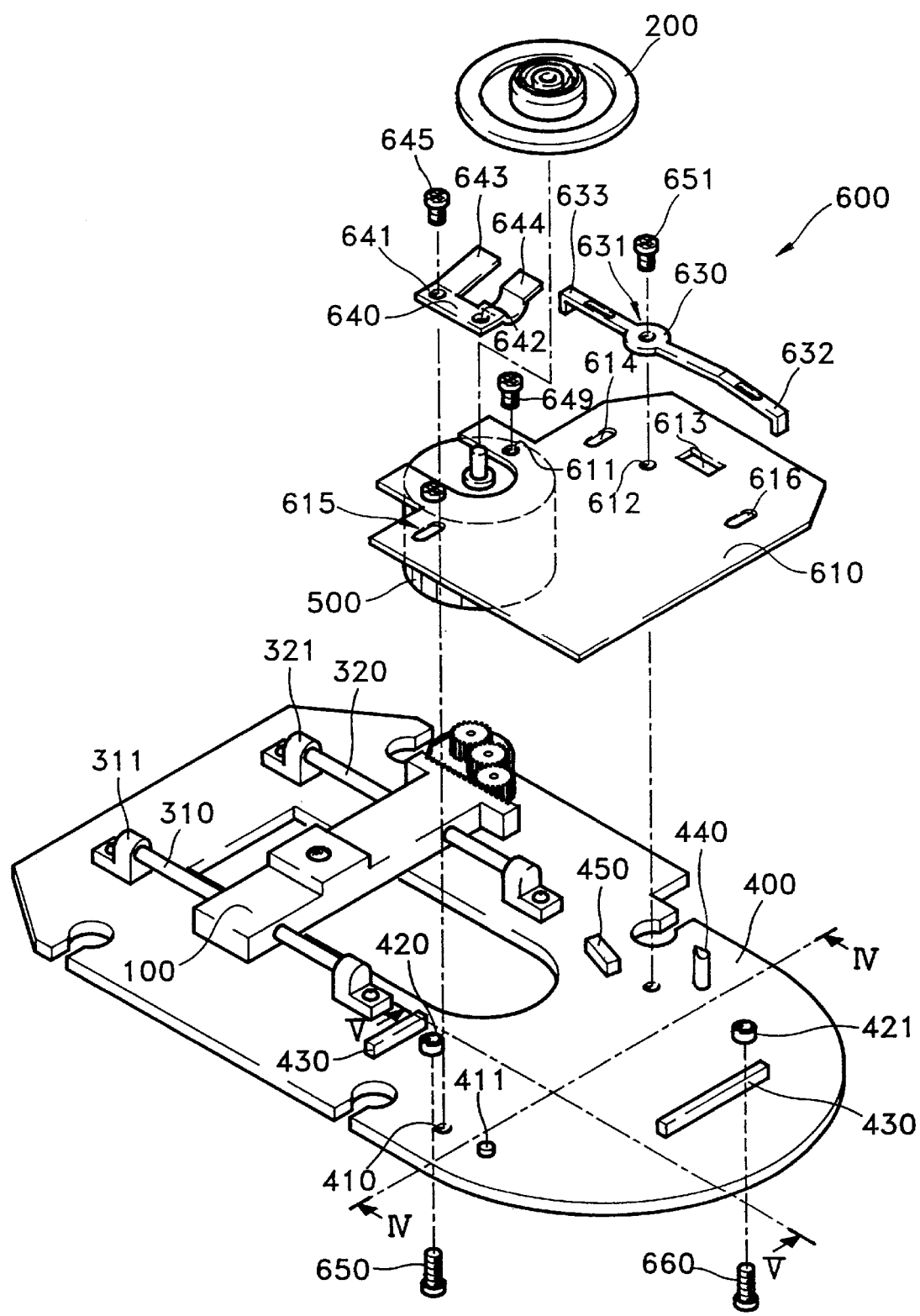
FIG. 2 is an exploded perspective view illustrating a phase-shift and tilt adjustable disk player according to the present invention.

Referring to FIG. 2, in the disk player according to the present invention, the optical axis of the light irradiated from an optical pickup 100 to a disk (not shown) placed on a turntable 200 is prevented from being at an angle by effectively adjusting the slant and position of a spindle motor 500 using an adjusting mechanism 600.

First and second guide rails 310 and 320 are fixed to the deck 400 by brackets 311 and 321, and the optical pickup 100 is installed for reciprocation along the first and second guide rails 310 and 320. The spindle motor 500 is installed at the deck 400 by the adjusting mechanism 600.

The adjusting mechanism 600 includes a motor plate 610 to which the spindle motor 500 is fixed by screws 649 passing through coupling holes 611, first and second elastic members 630 and 640 which couple the motor plate 610 to the deck 400 and at the same time elastically bias the motor plate 610 toward the deck 400, adjusting screws, comprised of a tangential screw 650 and a radial screw 660, which are coupled to the deck 400 and lift the end portion of the motor plate 610 from the deck 400, and a phase-shift adjusting member 440 for moving the motor plate 610 horizontally. The tangential screw 650 is screw-threaded to a tangential screw hole 420 formed in the deck 400 and used for adjusting the tilt in a tangential direction. The radial screw 660 is screw-threaded to a radial screw hole 421 formed in the deck 400 and used for adjusting the tilt in a radial direction. The tangential screw hole 420 is perpendicular to the radial screw hole 421 with respect to a hinge protrusion 450 formed on the deck 400 and which is a pivoting center. Thus, as described later, the side portion of the motor plate 610 can be lifted from the deck 400 pivoting around the hinge protrusion 450 by rotating the screws 650 and 660.

The first and second elastic members 630 and 640, which are leaf springs for elastically pressing the motor plate 610 toward the deck 400, can be used independently or together. The first elastic member 630 in which a first fixing hole 631 is formed has a first elastic rib 632 and a second elastic rib 633. The first elastic member 630 is fixed to the deck 400 by a screw 651 which is coupled to a plate hole 612 through the first fixing hole 631, and the first and second elastic ribs 632 and 633 press the motor plate 610 elastically toward the deck 400.

The second elastic member 640 in which a first fixing hole 641 and a second fixing hole 642 are formed has a first elastic rib 643 and a second elastic rib 644. The second elastic member 640 is fixed to the deck 400 by a screw 645 which is coupled to the screw hole 410 through the first fixing hole 641, and concurrently, a fixed protrusion 411 formed on the deck 400 is inserted into the second fixing hole 642. Thus, the first and second elastic ribs 643 and 644 of the second elastic member 640 elastically press the motor plate 610 toward the deck 400.

Figure 3:
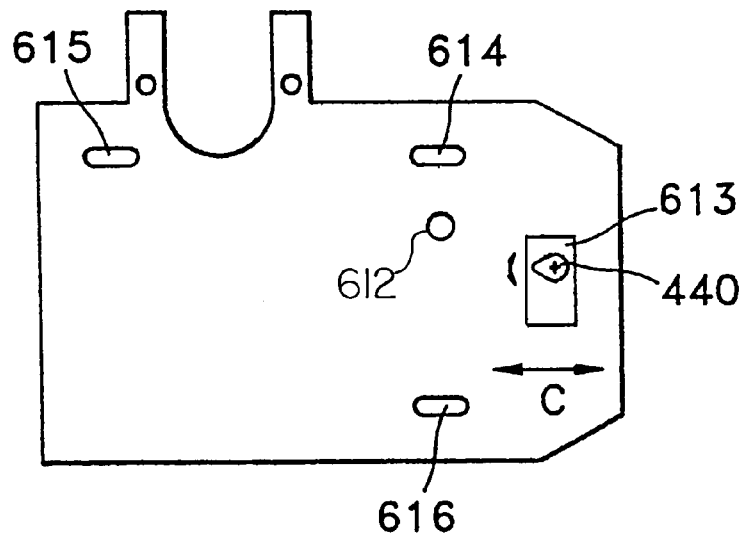
FIG. 3 is a plan view showing the motor plate shown in FIG. 2.

On the deck 400, two supporters 430 for supporting the motor plate 610 are formed. Also, a phase-shift adjusting member 440 having an eccentric cam shape is rotatably installed on the deck 400 to be inserted into a phase hole 613 formed in the motor plate 610. As shown in FIG. 3, by rotating the phase-shift adjusting member 440, the motor plate 610 can be moved in the directions indicated by arrow C, i.e., in a tangential direction with respect to the disk, so that the phase shift can be adjusted. Preferably, a groove is formed in the phase-shift member 440 so that it can be rotated using a screwdriver.

Figure 4:
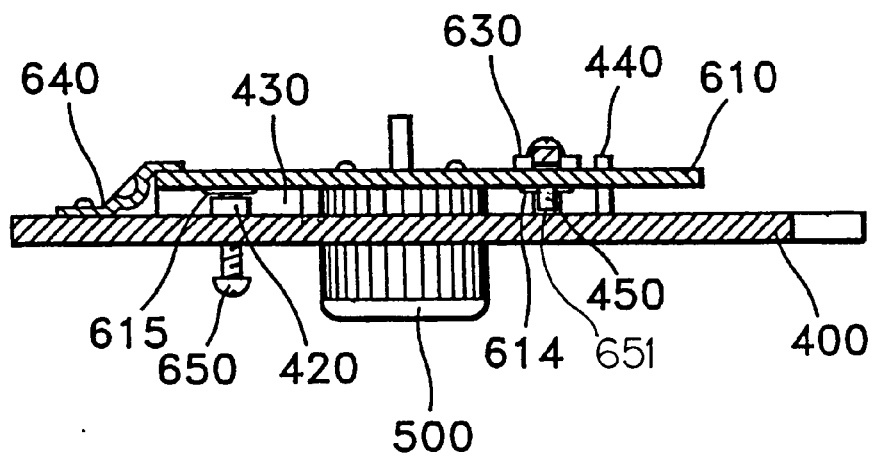
FIG. 4 is a sectional view taken along line IV—IV of FIG. 2 showing a profile of the disk player.

A hinge embossment 614, a tangential embossment 615 and a radial embossment 616 are formed to bulge from the bottom surface of the motor plate 610. As shown in FIG. 4, the hinge embossment 614 contacts the hinge protrusion 450 which protrudes from the deck 400, and the tangential embossment 615 contacts the end portion of the tangential screw 650 which is coupled to the tangential screw hole 420 of the deck 400. The hinge embossment 614 is used as a pivoting center of the motor plate 610 during the adjustment of the tilt in the tangential or radial direction. Also, as shown in FIG. 5, the radial embossment 616 contacts the end portion of the radial screw 660 which is screw-threaded to the radial screw hole 421 formed in the deck 400.

The operation of the phase-shift and tilt adjustable disk player according to the present invention will now be described with reference to the attached drawings.

Referring to FIGS. 2 and 4, the tangential tilt with respect to the disk is adjusted by rotating the tangential screw 650. When the tangential screw 650 is rotated in one direction, one side of the motor plate 610 is lifted by pivoting around a contact point between the hinge protrusion 450 and the hinge embossment 614. When the tangential screw 650 is rotated in the opposite direction, the side of the motor plate 610 is lowered by pivoting around the contact point since the motor plate 610 is biased toward the deck 400 by the first and second elastic members 630 and 640, thereby allowing the slant of the motor plate 610 to be adjusted in the tangential direction.

Figure 5:
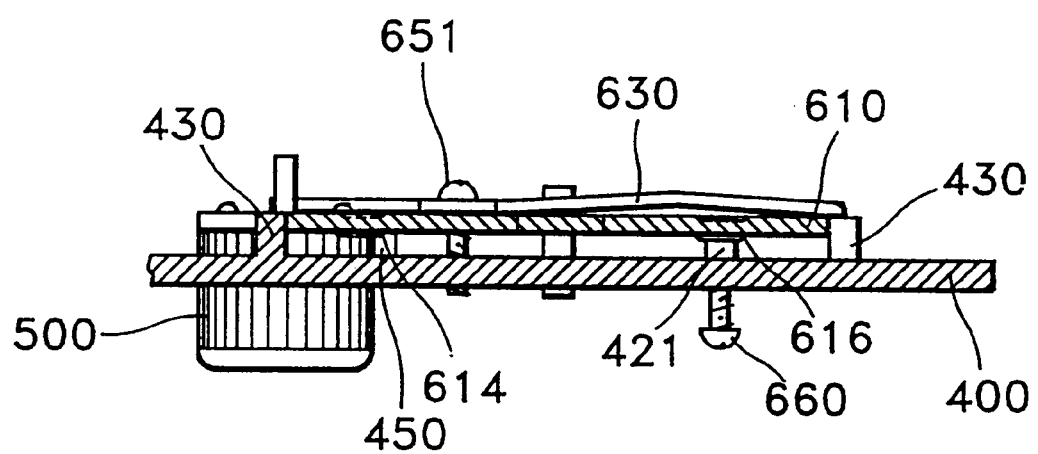
FIG. 5 is a sectional view taken along line V—V of FIG. 2 showing a profile of the disk player.

Referring to FIGS. 2 and 5, the radial tilt with respect to the disk is adjusted by rotating the radial screw 660. When the radial screw 660 is rotated in one direction, the other side of the motor plate 610 is lifted by pivoting around the contact point between the hinge protrusion 450 and the hinge embossment 614. When the radial screw 660 is rotated in the opposite direction, the other side of the motor plate 610 is lowered by pivoting around the contact point since the motor plate 610 is biased toward the deck 400 by the first and second elastic members 630 and 640, thereby allowing the slant of the motor plate 610 to be adjusted in the radial direction.

After the adjustment of tilt is completed, as shown in FIG. 3, the phase shift of the optical pickup is adjusted by appropriately moving the motor plate 610 in the direction C, i.e., the tangential direction, by rotating the phase adjusting member 440.

As described above, in the phase-shift and tilt adjustable disk player according to the present invention, the phase-shift and tilt of the optical pickup can be effectively adjusted by controlling the slant and tilt of the spindle motor.

It is noted that the present invention is not limited to the preferred embodiment described above, and it is apparent that variations and modifications by those skilled in the art can be effected within the spirit and scope of the present invention defined in the appended claims.

What is claimed is:

1. A phase-shift and tilt adjustable disk player comprising:
   a deck;
   a motor plate to which a spindle motor is fixed, said motor plate defining a top surface and a bottom surface;
   means for elastically attaching said motor plate to said deck and simultaneously elastically biasing said motor plate toward said deck;
   means for adjustably lifting and lowering said motor plate from said deck at one side by a rotation of said means for adjustably lifting and lowering said motor plate; and
   a cam-shaped phase adjusting member, rotatably installed on said deck, for moving said motor plate in a tangential direction of a disk.

2. The phase-shift and tilt adjustable disk player as claimed in claim 1, further comprising a hinge embossment which bulges from the bottom surface of said motor plate, and a hinge protrusion formed on said deck so as to contact said hinge embossment, wherein a side portion of said motor plate is lifted or lowered by pivoting around a contact point with said hinge protrusion.

3. The phase-shift and tilt adjustable disk player as claimed in claim 2, wherein said means for adjustably lifting and lowering said motor plate comprises:
   a tangential screw having an end portion which contacts one side portion of the bottom surface of said motor plate in order to adjust the tilt thereof in a tangential direction; and
   a radial screw, installed to be perpendicular to said tangential screw with respect to said contact point, of which an end portion contacts another side portion of the bottom surface of said motor plate to adjust the tilt thereof in a radial direction.

4. The phase-shift and tilt adjustable disk player as claimed in claim 3, wherein embossments each contacting the respective end portions of said tangential screw and said radial screw are formed on the bottom surface of said motor plate.

5. The phase-shift and tilt adjustable disk player as claimed in claim 1, wherein said means for elastically attaching comprises at least two leaf springs which are fixed to said deck and respectively press said motor plate from sides thereof so as to press said motor plate toward said deck.

6. The phase-shift and tilt adjustable disk player as claimed in claim 1, wherein said motor plate includes a phase hole and said phase adjusting member is inserted into said phase hole, and further wherein said motor plate is moved according to the rotation of said phase adjusting member.

7. The phase-shift and tilt adjustable disk player as claimed in claim 1, further comprising a supporter formed on said deck and which contacts the bottom surface of said motor plate to support said motor plate.

8. A phase-shift and tilt adjustable disk player for recording information on and/or reproducing information from a disk, comprising:

a deck;

a motor plate having a spindle motor mounted thereon, said motor plate defining a top surface and a bottom surface;

first and second elastic members which couple said motor plate to said deck and which simultaneously bias said motor plate toward said deck;

a tangential screw having an end portion which contacts one side portion of the bottom surface of said motor plate in order to adjust the tilt in a tangential direction;

a radial screw having an end portion which contacts another side portion of the bottom surface of said motor plate to adjust the tilt thereof in a radial direction; and a cam-shaped phase adjustment member rotatably installed on said deck and which moves said motor plate in a tangential direction of the disk.

9. The disk player as claimed in claim 8, wherein said first and second elastic members each comprises a leaf spring.

10. The disk player as claimed in claim 8, wherein said motor plate includes a phase hole and said phase adjusting member is inserted into said phase hole, and further wherein said motor plate is moved according to the rotation of said phase adjusting member.

11. The disk player as claimed in claim 8, further comprising a supporter formed on said deck and which contacts the bottom surface of said motor plate to support said motor plate.

12. The disk player as claimed in claim 8, wherein embossments each contacting the respective end portions of said tangential screw and said radial screw are formed on the bottom surface of said motor plate.

* * * * *